(12) United States Patent
Liu et al.

(10) Patent No.: US 8,836,290 B2
(45) Date of Patent: Sep. 16, 2014

(54) BATTERY CELL MONITORING AND BALANCING CIRCUIT

(75) Inventors: Liusheng Liu, San Jose, CA (US);
Guoxing Li, Sunnyvale, CA (US)

(73) Assignee: O2MIcro International Limited, Grand Cayman (KY)

( * ) Notice: Subject to any disclaimer, the term of this patent is extended or adjusted under 35 U.S.C. 154(b) by 187 days.

(21) Appl. No.: 13/214,611

(22) Filed: Aug. 22, 2011

(65) Prior Publication Data
US 2011/0298425 A1    Dec. 8, 2011

Related U.S. Application Data (60) Division of application No. 12/759,623, filed on Apr. 13, 2010, now Pat. No. 8,004,246, which is a continuation of application No. 11/459,473, filed on Jul. 24, 2006, now Pat. No. 7,696,725, which is a division of application No. 10/464,973, filed on Jun. 19, 2003, now Pat. No. 7,081,737.

(51) Int. Cl.
*H02J 7/04* (2006.01)
*H01M 10/44* (2006.01)
*H02J 7/00* (2006.01)

(52) U.S. Cl.
CPC ............ *H01M 10/441* (2013.01); *Y02E 60/12* (2013.01); *H02J 7/0018* (2013.01)
USPC .......................................... 320/157; 320/136

(58) Field of Classification Search
USPC .......................... 320/136, 157, 158, 162, 163
See application file for complete search history.

(56) References Cited

U.S. PATENT DOCUMENTS

| | | |
|---|---|---|
| 4,418,310 A | 11/1983 | Bollinger |
| 5,268,630 A | 12/1993 | Bhagwat et al. |
| 5,284,719 A | 2/1994 | Landau et al. |

(Continued)

FOREIGN PATENT DOCUMENTS

| | | |
|---|---|---|
| CN | 1713447 A | 12/2005 |
| EP | 0709943 A2 | 5/1996 |

(Continued)

OTHER PUBLICATIONS

English Translation of China first OA for CN 2008100931845.

(Continued)

*Primary Examiner* — Arun Williams
*Assistant Examiner* — Aaron Piggush
(74) *Attorney, Agent, or Firm* — Pillsbury Winthrop Shaw Pittman LLP (57) ABSTRACT

A monitoring circuit for accurately monitoring a voltage level from each of a plurality of battery cells of a battery pack includes an analog to digital converter (ADC) and a processor. The ADC is configured to accept an analog voltage signal from each of the plurality of battery cells and convert each analog voltage signal to a digital signal representative of an accurate voltage level of each battery cell. The processor receives such signals and provides a safety alert signal based on at least one of the signals. The ADC resolution may be adjustable. A balancing circuit provides a balancing signal if at least two of the digital signals indicate a voltage difference between two cells is greater than a battery cell balance threshold. An electronic device including such monitoring and balancing circuits is also provided. Various methods are also provided.

17 Claims, 6 Drawing Sheets

(56) References Cited

U.S. PATENT DOCUMENTS

| | | |
|---|---|---|
| 5,628,630 A | 5/1997 | Misch et al. |
| 5,646,503 A | 7/1997 | Stockstad |
| 5,648,717 A | 7/1997 | Uskali |
| 5,652,501 A | 7/1997 | McClure et al. |
| 5,656,915 A * | 8/1997 | Eaves ........................... 320/118 |
| 5,680,027 A | 10/1997 | Hiratsuka et al. |
| 5,691,742 A | 11/1997 | O'Connor et al. |
| 5,710,501 A | 1/1998 | Van Phuoc et al. |
| 5,789,903 A | 8/1998 | Young et al. |
| 5,811,890 A | 9/1998 | Hamamoto |
| 5,850,136 A | 12/1998 | Kaneko |
| 5,889,385 A | 3/1999 | Podrazhansky et al. |
| 5,894,212 A | 4/1999 | Balogh |
| 5,949,217 A | 9/1999 | Okada et al. |
| 5,952,815 A * | 9/1999 | Rouillard et al. ............. 320/116 |
| 5,955,869 A | 9/1999 | Rathmann |
| 5,994,873 A | 11/1999 | Shiojima |
| 6,037,751 A | 3/2000 | Klang |
| 6,064,179 A | 5/2000 | Ito et al. |
| 6,114,835 A | 9/2000 | Price |
| 6,150,795 A | 11/2000 | Kutkut et al. |
| 6,157,169 A | 12/2000 | Lee |
| 6,268,710 B1 | 7/2001 | Koga |
| 6,285,161 B1 | 9/2001 | Popescu |
| 6,288,520 B1 | 9/2001 | Kim |
| 6,329,796 B1 | 12/2001 | Popescu |
| 6,437,540 B2 | 8/2002 | Sonobe |
| 6,694,129 B2 | 2/2004 | Peterzell et al. |
| 6,744,394 B2 | 6/2004 | Liu et al. |
| 6,762,588 B2 | 7/2004 | Miyazaki et al. |
| 6,891,355 B2 | 5/2005 | Kernahan |
| 7,081,737 B2 | 7/2006 | Liu et al. |
| 7,336,055 B2 | 2/2008 | Ishishita |
| 7,696,725 B2 | 4/2010 | Liu et al. |
| 2002/0105304 A1 | 8/2002 | Hald et al. |
| 2004/0041569 A1 | 3/2004 | Furukawa |
| 2004/0113586 A1 * | 6/2004 | Chen ........................... 320/118 |
| 2006/0208850 A1 | 9/2006 | Ikeuchi et al. |

FOREIGN PATENT DOCUMENTS

| | | |
|---|---|---|
| JP | 6265609 A | 9/1994 |
| JP | 08019188 A | 1/1996 |
| JP | 10164765 A | 6/1998 |
| JP | 11355966 A | 12/1999 |
| JP | 2000092732 A | 3/2000 |
| JP | 2001268810 A | 9/2001 |
| JP | 2002223525 A | 8/2002 |
| JP | 2002243771 A | 8/2002 |
| JP | 2002223525 | 9/2002 |
| KR | 2003-21666 | 9/2001 |
| KR | 20030021666 A | 3/2003 |

OTHER PUBLICATIONS

Stephen W. Moore and Peter J. Schneider, "A Review of Cell Equalization Methods for Lithium Ion and Lithium Polymer Batter Systems," Society of Automotive Engineers, Inc., 2001.

"Advanced Gas Gauge Host Firmware Guide for the TI Battery Monitors ICs," Texas Instruments, May 2001.

"SBS Compliant Gas Gauge IC for Use with the bq29311," Texas Instruments, Apr. 2002.

"Gas Gauge IC with SMBus Interface," Benchmarq Products from Texas Instruments, bq2040, Jun. 1999.

"Gas Gauging Basics Using TI's Battery Monitor ICs," Texas Instruments, May 2001.

"SBS v1.1—Compliant Gas Gauge IC," Benchmarq Products from Texas Instruments, bq2060, Dec. 2000.

English Translation of Japanese Notice of Reasons for Rejection with Examiner's Comments, mailed Jun. 6, 2006, received in corresponding Japanese Application (4 pages).

* cited by examiner

BATTERY CELL MONITORING AND BALANCING CIRCUIT

RELATED APPLICATION

This application is a divisional of U.S. patent application Ser. No. 12/759,623 filed Apr. 13, 2010, now U.S. Pat. No. 8,004,246, which is a continuation of U.S. patent application Ser. No. 11/459,473, filed Jul. 24, 2006, now U.S. Pat. No. 7,696,725, which is a divisional application of U.S. patent application Ser. No. 10/464,973, filed Jun. 19, 2003, now U.S. Pat. No. 7,081,737, which are hereby incorporated by reference in their entirety.

FIELD OF THE INVENTION

The present invention relates to a battery cell monitoring and balancing circuit, and in particular to such a circuit that directly digitizes analog battery cell voltage levels into associated digital signals.

BACKGROUND OF THE INVENTION

Multi-cell rechargeable batteries are utilized in a variety of applications given their higher voltage delivery and greater capacity. Such applications include, but are not limited to, electronic devices such as laptops, cellular phones, personal digital assistants, and the like. Certain types of battery cells, e.g., lithium ion cells, can be hazardous if charged significantly above its normal charge range or discharged below its normal charge range. As such, a typical monitoring and protection circuit may utilize a switch network to transfer voltage charges to a capacitor. Voltage on the capacitor then represents the battery cell voltage and may then be provided to a plurality of comparators for comparing the voltage to various threshold levels such as over voltage and under voltage levels.

There are several drawbacks to such an arrangement. First, such an arrangement may provide for unreliable voltage measurements. For instance, if the current through a particular cell is not constant or the cell voltage fluctuates because of the internal resistance of the cell or some other factors, the sampled voltage may not be truly indicative of the voltage on the cell. As such, corrective measures may be incorrectly taken based on such erroneous measurements.

Second, the threshold levels such as over voltage and under voltage are not easily adjustable. This is an issue since different battery pack types and different manufacturers for the same battery pack type may require different over and under voltage thresholds. For example, one battery pack manufacture may require a 3.0 volt under voltage threshold while another may require 2.5 volts for the same battery pack type. Third, when the cells in one battery pack are unbalanced (e.g., after many charging and discharging cycles) a traditional bleeding method can be undertaken to balance the cell. However, a bleeding decision is typically made only when the battery is near fully charged at the time of charging. Since bleeding current is typically limited in order to avoid excessive heat generation, bleeding takes a certain time interval. If more than one cell needs to be bled, there is simply not enough time in one charge cycle to accomplish this task.

Accordingly, there is a need in the art for a cell monitoring and balancing circuit that overcomes these and other deficiencies in the prior art.

BRIEF SUMMARY OF THE INVENTION

A monitoring circuit for accurately monitoring a voltage level from each of a plurality of battery cells of a battery pack consistent with the invention includes an analog to digital converter (ADC) and a processor. The ADC is configured to accept an analog voltage signal from each of the plurality of battery cells and convert each analog voltage signal to a digital signal representative of a voltage level of each battery cell. The processor is configured to receive each digital signal and to provide a safety alert signal based on at least one of the digital signals.

According to another embodiment of the invention, a balancing circuit is provided. The balancing circuit includes an ADC configured to accept an analog voltage signal from each of a plurality of battery cells of a battery pack and to convert each analog voltage signal to a digital signal representative of a voltage level of each battery cell. The balancing circuit also includes a processor configured to receive each digital signal and to provide a balance signal if at least two of the digital signals are representative of a voltage difference between a first voltage level of a first battery cell and a second voltage level of a second battery cell greater than a battery cell balance threshold.

In yet a further embodiment of the invention, an electronic device capable of being powered by a battery pack having a plurality of battery cells is provided. The electronic device includes a monitoring circuit for accurately monitoring a voltage level from each of the plurality of battery cells. The monitoring circuit includes an ADC configured to accept an analog voltage signal from each of the plurality of battery cells and convert each analog voltage signal to a digital signal representative of a voltage level of each battery cell. The monitoring circuit also includes a processor configured to receive each digital signal and to provide a safety alert signal based on at least one of the digital signals.

In still a further embodiment of the invention, an electronic device capable of being powered by a battery pack having a plurality of battery cells is provided. The electronic device includes a balancing circuit, where the balancing circuit includes and ADC configured to accept an analog voltage signal from each of the plurality of battery cells and convert each analog voltage signal to a digital signal representative of a voltage level of each battery cell. The balancing circuit also includes a processor configured to receive each digital signal and to provide a balance signal if at least two of the digital signals are representative of a voltage difference between a first voltage level of a first battery cell and a second voltage level of a second battery cell greater than a battery cell balance threshold.

In still another embodiment of the invention, there is provided balancing circuit including an ADC configured to accept an analog voltage signal from each of a plurality of battery cells of a battery pack and convert each analog voltage signal to a digital signal representative of a voltage level of each battery cell. The balancing circuit further includes a processor configured to receive each digital signal and to provide a pre-balance signal during a second mode before a voltage difference between a first voltage level of a first battery cell and a second voltage level of a second battery cell exceeds a battery cell balance threshold if the voltage difference existed during a first mode.

In another embodiment, a method of balancing voltage levels for a plurality of battery cells of a battery pack is provided. The method includes the steps of: converting a first analog voltage signal from a first cell to a first digital signal representative of the first analog voltage signal; converting a second analog voltage signal from a second cell to a second digital signal representative of the second analog voltage signal; determining a difference between the first voltage level and the second voltage level; comparing the difference to a battery cell balance threshold; and providing a balance signal if the difference is greater than the battery cell balance threshold.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
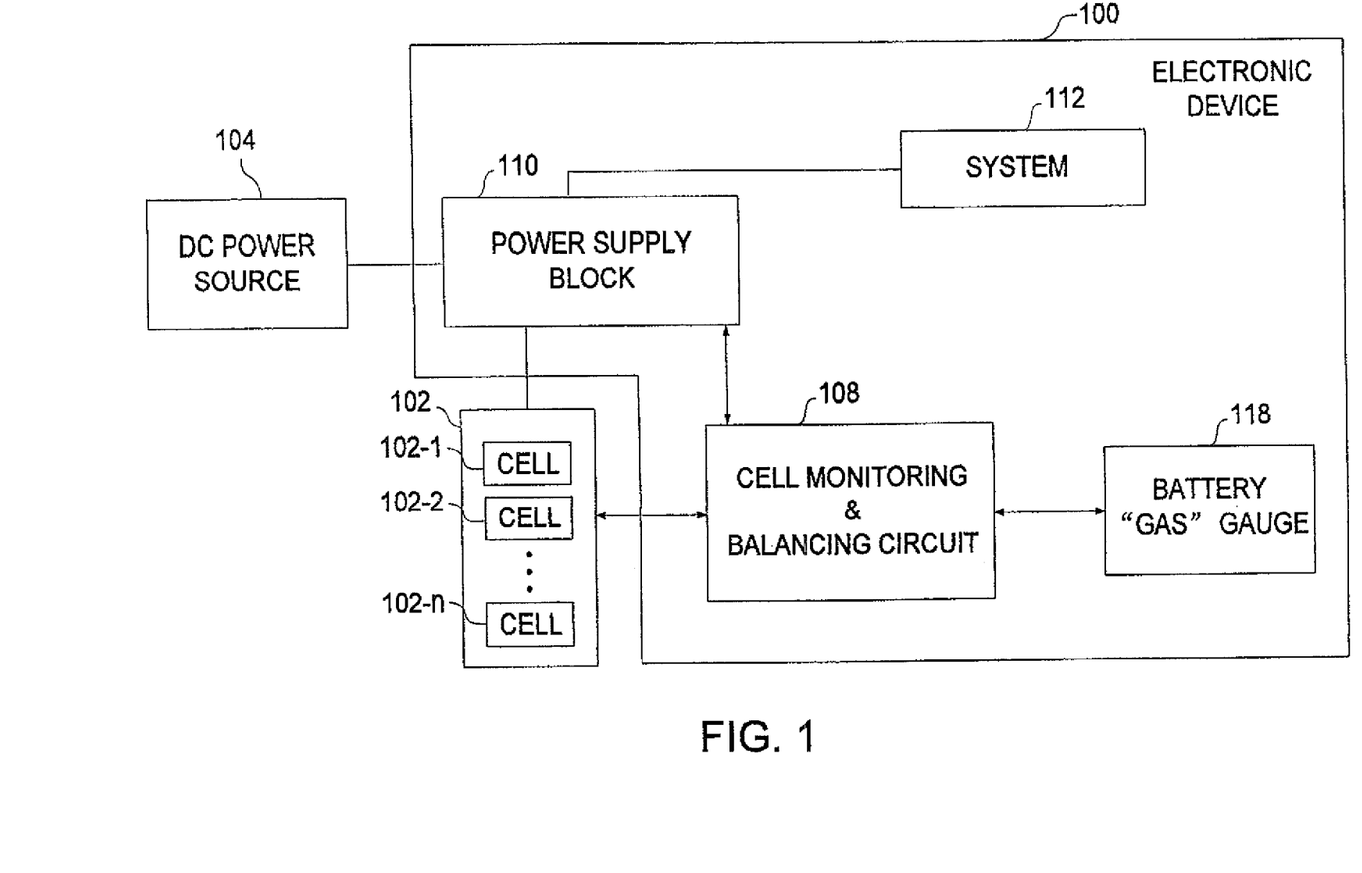
FIG. 1 is a simplified high level block diagram of an electronic device that may receive power from a battery pack having a plurality of battery cells, where the electronic device has a cell monitoring and balancing circuit consistent with the present invention.

Turning to FIG. 1, a simplified block diagram of an electronic device 100 capable of being powered from a battery pack 102 or a DC power source 104 is illustrated. The battery pack 102 may containing a plurality of battery cells 102-1, 102-2, 102-*n*. The cell types may be of various rechargeable types known in the art such as lithium-ion, nickel-cadmium, nickel-metal hydride batteries, or the like.

If the electronic device 100 is a laptop computer it would include a variety of components known to those skilled in the art which are not illustrated in FIG. 1. For example, the laptop may include an input device for inputting data to the laptop, a central processing unit (CPU) or processor, for example a Pentium processor available from Intel Corporation, for executing instructions and controlling operation of the laptop, and an output device, e.g., a LCD or speakers, for outputting data from the laptop.

To recharge the battery pack 102 and/or supply power to the system 112, a DC power source 104 may be coupled to the device 100. The DC power source 104 may be an AC/DC adapter which is configured to receive conventional 120 volts AC from a wall outlet and convert it to a DC output voltage. The DC power source 104 may also be a DC/DC adapter such as a "cigarette lighter" type adapter configured to plug into that type of socket. Such a DC power source 104 is illustrated in FIG. 1 as separate from the device 100, but it may be built into some devices. The electronic device 100 may also have a power supply block 110. In general, the power supply block 110 includes various components to monitor, control, and direct power from each power source 102, 104 to each other and to the system 112 of the electronic device 100 under various conditions.

Advantageously, the electronic device 100 includes a cell monitoring and balancing circuit 108 as further detailed herein. The cell monitoring and balancing circuit 108 is shown separate from the power supply block 110 for clarity, but it may be included as part of the power supply block 110.

The cell monitoring and balancing circuit 108 may function as a monitoring circuit, a balancing circuit, or both as further detailed herein. The cell monitoring and balancing circuit 108 provides digital signals representative of the voltage level of each cell 102-1, 102-2, 102-*n* to various components of the device such as a battery gas gauge 118. The battery gas gauge may utilize such signals to provide an output signal representative of the remaining useful life of the battery pack 102.

Figure 2:
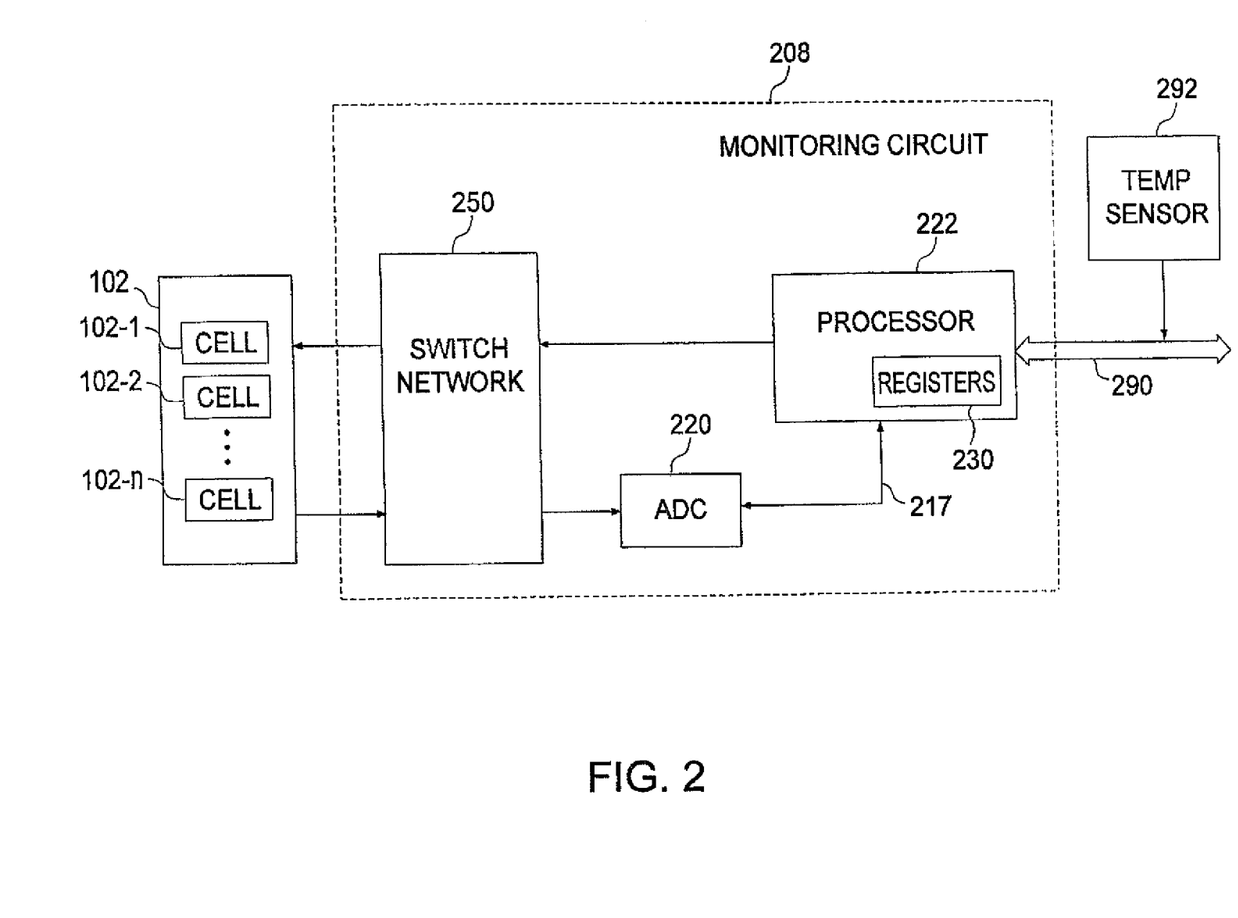
FIG. 2 is a block diagram of a monitoring circuit that may be utilized in the electronic device of FIG. 1.

Turning to FIG. 2, a block diagram of an exemplary monitoring circuit 208 that may be utilized as the monitoring portion of the cell monitoring and balancing circuit 108 of FIG. 1 is illustrated. The monitoring circuit 208 generally includes an analog to digital converter (ADC) 220 and a processor 222. The ADC 220 is configured to accept an analog voltage signal from each of the battery cells 102-1, 102-2, 102-*n* and convert each to a digital signal. The processor 220 is configured to receive each digital signal and provide a safety alert signal based on at least one of the digital signals.

Advantageously, the ADC 220 may function as an "averaging" type ADC to take an "average" reading of the voltage of each battery cell 102-1, 1-2-2, 102-*n* such that transient deviations from normal readings will not adversely impact the quality of the digital signal representation of the analog signal. For example, such transient deviations could include voltage spikes or other rapid voltage fluctuations that can occur due to a number of factors including varying charging currents or load currents passing through the internal resistance of the cells.

The ADC 220 may include one or more various types of ADCs to function as an averaging type ADC. For instance, the ADC 212 may include a single-slope integrating ADC, a dual-slope integrating type ADC, or a sigma-delta type ADC to name a few. Such a sigma-delta type ADC generally includes an analog modulator portion that essentially digitizes an input analog signal at very high sampling frequency equal to Fs×OSR, where Fs is the Nyquist Frequency and OSR is the over sampling ratio to the Nyquist Frequency. The outputs from this over sampling may be combined in groups and the groups may be averaged. An analog signal representing the voltage of any particular battery cell 102-1, 102-2, 102-*n* may thus be sampled many times, e.g., in the thousands of times in some instances. As such, a few incorrect samplings of transient deviations will have little effect on the average signal converted by the averaging type ADC 220 to an associated digital signal.

In addition, the ADC 220 may also have an adjustable resolution depending on a particular need. For instance, the processor 222 may instruct the ADC 220 via data path 217 to utilize a desired resolution level for a particular conversion of an analog signal from a particular battery cell 102-1, 102-2, 102-*n* to an associated digital signal. The resolution may be adjusted to a relatively higher resolution in situations where there is more sensitivity to the analog voltage measurement. For example, such a situation requiring higher resolution may be for open circuit voltage detection.

In contrast, resolution may be adjusted to a relatively lower resolution in situations where there is less sensitivity to the analog voltage measurement. For example, such a situation requiring lower resolution may be for under-voltage detection. The lower the resolution, the less time is needed to complete one valid analog to digital conversion. In one of many examples, a relatively higher resolution may require 15 bits of data while the relatively lower resolution may only require 10 bits of data. Those skilled in the art will recognize the actual number of bits may vary depending on the particular requirements for the digital data and the resolution capabilities of the ADC 220.

To achieve a desired resolution value, the ADC 220 may be of any type of ADC that can adjust resolution upon direction from the ADC control signal from the processor 222. For instance, the ADC 220 may be a sigma-delta type as earlier detailed. Such a sigma-delta modulator type can adjust resolution based, in part, on the OSR. In general, higher resolution can be obtained with a higher OSR.

The ADC 220 may also be a successive approximation type ADC. In general, a successive approximation type ADC conceptually uses a single comparator to make its conversion. If N bits of resolution are desired as indicated by the control signal from the processor 220, a successive approximation type ADC would make N comparator operations to achieve N bits of resolution. Other types of ADCs such as a single-slope or dual-slope integrating type ADC, and or combinations of various types of ADCs may be used in an ADC 220 consistent with the invention to achieve an adjustable resolution.

The processor 222 is configured to receive digital signals from the ADC 220 representative of the voltage level of each battery cell 102-1, 102-2, 102-n and to provide a safety alert signal based on at least one of the digital signals. The safety alert signal may be a charge alert signal or a discharge alert signal.

During charging of the battery pack 102 by the DC power source 104, it is important to monitor the voltage level of each cell in order to protect against over voltage conditions. This is because certain types of electrolyte battery cells, such as lithium ion cells, are susceptible to damage if charged above their normal threshold level. As such, the processor 222 sends a charge alert signal if the digital signals from the ADC 220 indicate that at least one of the cells 102-1, 102-2, 102-n has a voltage level greater than an over voltage threshold value over a predetermined time interval. As such, some preventative action may then be taken such as to stop charging. Alternatively, the processor 222 may also provide the charge alert signal if one of the digital signals from the ADC 220 indicates that one cell has a voltage level greater than the over voltage threshold level while the battery pack 102 is being charged.

During discharging of the battery pack 102, the monitoring circuit 208 may utilize a plurality of under voltage threshold levels to prevent damage to the cells and to provide adequate warnings to a user of an associated electronic device 100. For instance, the processor 222 may send a discharge alert signal if the digital signals from the ADC 220 indicate that at least one of the cells 102-1, 102-2, 102-n has a voltage level lower than an under voltage threshold value over a predetermined time interval while the battery pack 102 is being discharged. As such, some preventative action may then be taken such as to stop power supply from the battery pack. Alternatively, the processor 222 may also provide the discharge alert signal if one of the digital signals from the ADC 220 indicates that one cell has a voltage level less than the under voltage threshold level while the battery pack 102 is being discharged.

In addition to the under voltage threshold level, other under voltage threshold voltage levels greater than the under voltage threshold level may also be utilized by the processor 222 to provide advanced notice of a potentially impending low voltage condition. For instance, if the electronic device 100 is a laptop computer and the under voltage threshold level is reached without any notice to the user, a user may lose a significant amount of important unsaved data.

Therefore, a first under voltage threshold level may be programmed into and stored in any applicable memory device of the system 100. As the processor 222 receives digital signals from the ADC 220 representative of the voltage levels of each cell, the processor 222 can compare such voltage levels to the first under voltage threshold level. If the voltage level on one of the cells drops below such level, the processor 222 can provide an appropriate signal via path 290 to other components of the system 100. As such, an alert message may then be provided to a user of the electronic device 100. The first under voltage threshold level may be chosen based on the system 100 particulars including the time required to perform typical tasks and the power required for such tasks.

For instance, if the electronic device 100 is a laptop computer the first threshold level may be chosen high enough that upon notice of a low power condition (e.g., one cell of the cells 102-1, 102-2, 102-n has a voltage level less than the first threshold level) a user still has enough power and time to operate the laptop for an additional time period. Another second threshold level, which is less than the first threshold level, may also be utilized to indicate that a shorter time period is available to the user for proper operation. For instance, if the any cell voltage is less than the second threshold level, another alert signal may indicate to the user that there is likely only enough time for saving and shutting down of the laptop computer before the under voltage threshold level is reached and battery power to the system is halted.

Advantageously, all threshold levels are adjustable by the processor 222. For instance, the over and under voltage threshold level may be adjusted based on the particular type of cell utilized. The over and under voltage threshold values may be stored in any variety of electronic storage media in the device. For instance, the processor 222 may have internal registers 230 that could store such threshold levels.

In addition, the over and under voltage threshold level can be adjusted based on other parameters that affect the charging and discharging performance of the cells such as ambient temperature and age of the cells. Ambient temperature information may be provided to the processor 222 by a temperature sensor 292.

In addition, a sampling time interval is also adjustable by the processor 222. A sampling time interval includes that time period in which all cells are sampled once and a valid digital conversion is made by the ADC 220 for each cell. This enables the processor to sample the cells more frequently during certain conditions, e.g., during charging, when more frequent sampling is advantageous. This also enables the processor to sample the cells less frequently during other conditions, e.g., the battery pack 102 is in sleep or idle mode, when less frequent sampling is adequate. For example, such a sampling time interval may be once per minute when the battery pack is in sleep or idle mode. As such, the ADC 220 may also be placed in a sleep mode by the processor 222 in order to conserve energy when it is not needed to make a conversion.

Figure 3A:
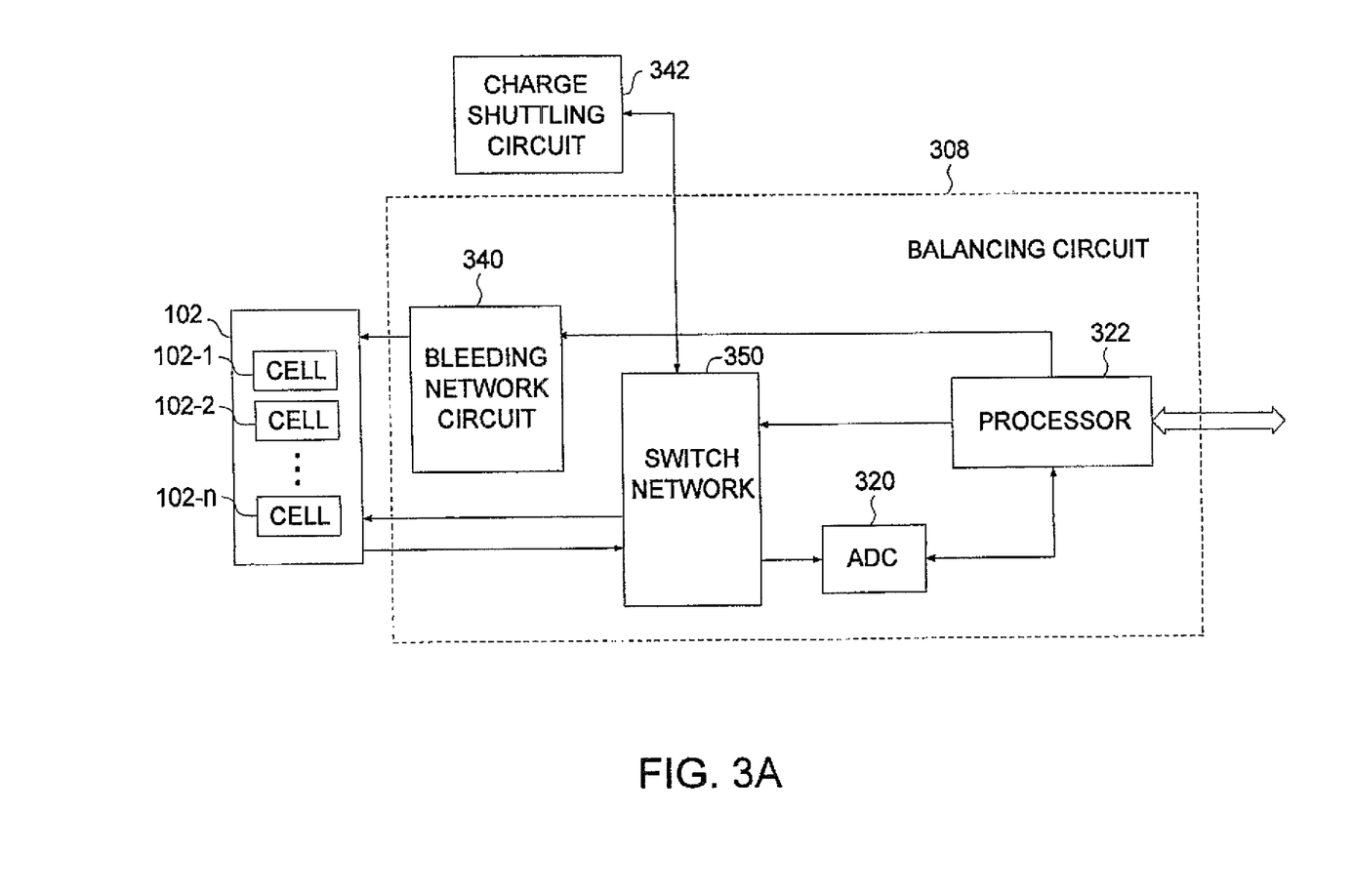
FIG. 3A is a block diagram of a balancing circuit that may be utilized in the electronic device of FIG. 1.

Turning to FIG. 3A, a block diagram of an exemplary balancing circuit 308 is illustrated that may be utilized in the electronic device of FIG. 1. The balancing circuit 308 generally includes an ADC 320 and processor 322 as previously detailed with respect to FIG. 2. In addition, the processor 322 controls either the bleeding network circuit 340, the charge shuttling circuit 342, or both to balance voltage levels of the cells 102-1, 102-2, 102-n as further detailed herein.

The processor 322 receives associated digital signals from the ADC 320 as previously detailed that are representative of an accurate voltage reading for each cell 102-1, 102-2, 102-n. As such, the processor 322 not only knows which cell has the highest voltage level and the lowest voltage level, it also knows the magnitude of the voltage difference between such cells and the voltage level of each cell. The processor 322 utilizes this information from the ADC 320 to make intelligent decisions regarding cell balancing as detailed herein that result in accurate and fast cell balancing.

First, cell balancing decisions may be made at any time (during charging mode, discharging mode, or even during idle mode) whenever there is a voltage difference between the highest voltage cell and the lowest voltage cell that is greater than some battery cell balance threshold. During charging, cell balancing is useful to control the cells with the higher voltage levels to enable the lower voltage level cells time to catch up. Since battery charging is typically limited by any one cell reaching its end of charge voltage level, this enables each cell to approach its end of cell voltage level. Otherwise, a cell that reached its end of voltage level charge quickly would prevent other cells from being more fully charged.

Since the processor 322 is repeatedly receiving updated accurate voltage information of each cell 102-1, 10202, 102-*n* from the ADC 320, it can instruct the bleeding network circuit 340 to conduct appropriate cell bleeding or it can instruct the charge shuttling circuit 342 to conduct appropriate charge transfers as soon as it detects a voltage difference between a higher voltage cell and a lower voltage cell is greater than a predetermined battery cell balance threshold.

Balancing can occur by providing a bleeding current to one or more of the cells having higher voltage levels during certain time intervals. Such time intervals may overlap such that bleeding for more than one cell may occur at similar times. In addition, the starting times for the bleeding of two or more cells can start at substantially the same time in order to speed up the bleeding process. Furthermore, cell bleeding can be adjusted based on the difference in voltage between the higher and lower voltage cells. As such, a first cell with a relatively higher voltage level may be bled by a higher bleeding current than a second cell with a voltage level slightly less than the first cell.

In general, the greater the difference between the higher voltage cell and lower voltage cell, the greater the bleeding current provided by the bleeding network circuit 340. The upper limit of such bleeding current is typically limited by heat dissipation concerns. Also, the less the difference between the higher voltage cell and the lower voltage cell, the less bleeding current is provided by the bleeding network circuit 340.

Balancing cell voltage levels can occur not only by bleeding the cells with the higher voltage levels, but also by shuttling charges from higher voltage cells to lower voltage cells. Such charge shuttling is controlled by the processor 322 which provides appropriate control signals to the switch network 350 to control the shuttling of charge from cells with higher voltage levels to cells with lower voltage levels by utilizing the charge shuttling circuit 342.

The processor 322 knows which one or more cells 102-1, 102-2, 102-*n* have higher voltage readings compared to the others due to the digital signals received from the ADC 320. As such, the processor 322 may direct the appropriate switches in the switch network 350 to close such that one or more cells with a higher voltage level transfers some charge level to the charge shuttling circuit 342. The processor 322 may then further direct appropriate switches in the switch network 350 to close to transfer charges from the charge shuttling circuit 342 to the cell with a lower voltage level. Such a charge transfer process stops when the processor 322 instructs such process to stop, e.g., when the processor knows that an appropriate balanced voltage level is obtained between appropriate cells.

The processor 322 may also provide a pre-balance signal to the bleeding network circuit 340 or the charge shuttling circuit 342 to start a balancing process before an imbalance exists. The pre-balance signal may be provided in a second mode if a cell imbalance occurred in a first mode occurring before the second mode. The first mode may be a first charging mode or a first discharging mode. The second mode may be a second charging mode or a second discharging mode. For instance, the processor 322 has each cell's voltage information in digital form and knows the cells voltage history. After one or more modes, e.g., charging and discharging cycles, if the processor 322 notices that an imbalance always happens to one specific cell, e.g., if one cell has a lower voltage level towards the end of discharge, then the processor can start a balancing process during a later mode before a noticeable voltage difference is even detectable.

Figure 3B:
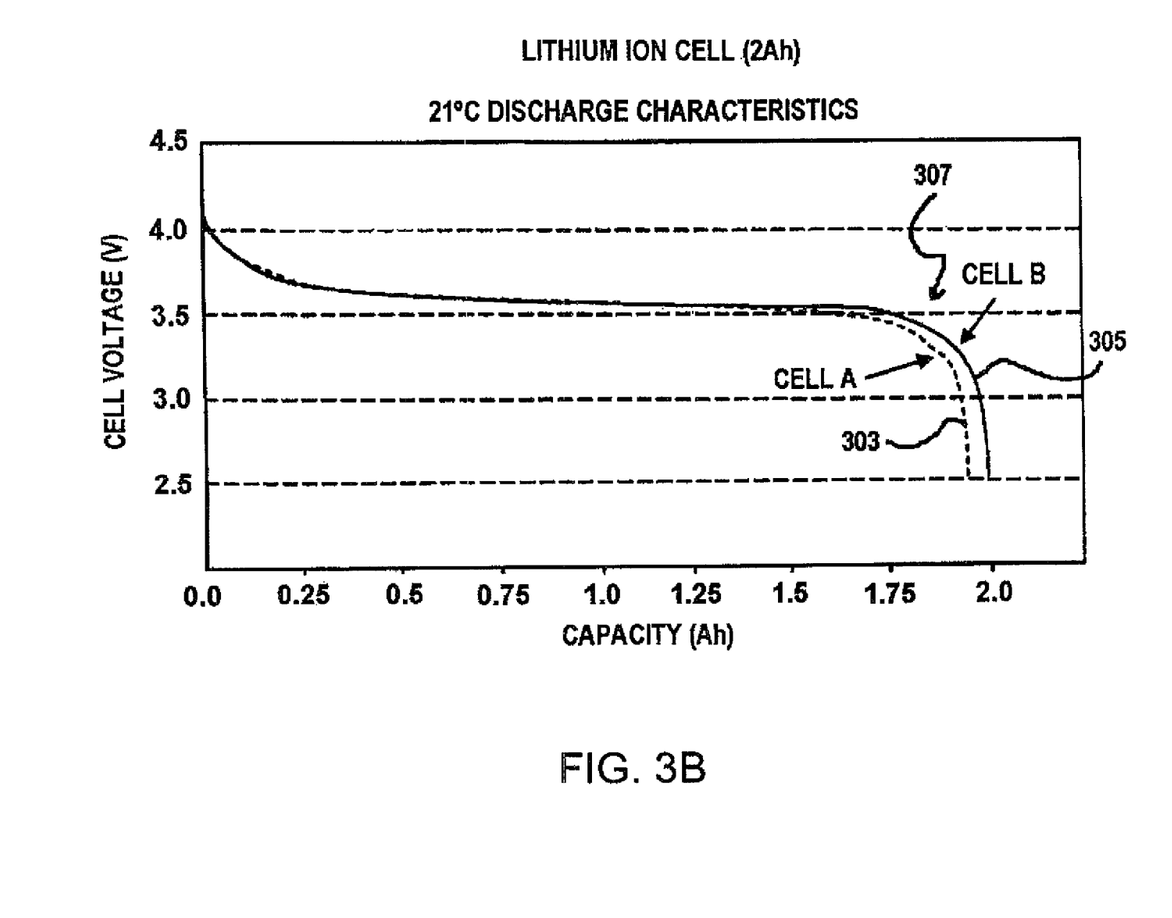
FIG. 3B is an exemplary plot of the discharge characteristics of two battery cells that may receive a pre-balancing signal from the balancing circuit of FIG. 3A.

For instance, turning to FIG. 3B, an exemplary plot of capacity (Ah) of a lithium ion cell at 21 degree Celsius versus cell voltage is illustrated for an exemplary Cell A 303 and Cell B 305. As illustrated, it is not until near the end of discharge near the voltage drop knee 307 that the voltage difference between Cell A and Cell B becomes appreciable. If balancing waited until such an appreciable voltage difference, then there is little time to perform balancing. If however, the processor 322 knows that cell A typically has a lower voltage than cell B towards the end of discharge from at least one prior discharge cycle or mode, the processor 322 can start balancing for cell A early in a later discharge cycle or mode without waiting for the appreciable voltage difference to occur. For instance, the processor may instruct charges from Cell B and/or other cells to be transferred to the charge shuttling circuit 342 and then to Cell A early in the later discharge mode. In this way, Cell A may be balanced with Cell B so that no appreciable voltage difference exists between the cells near their end of discharge cycle.

Figure 4:
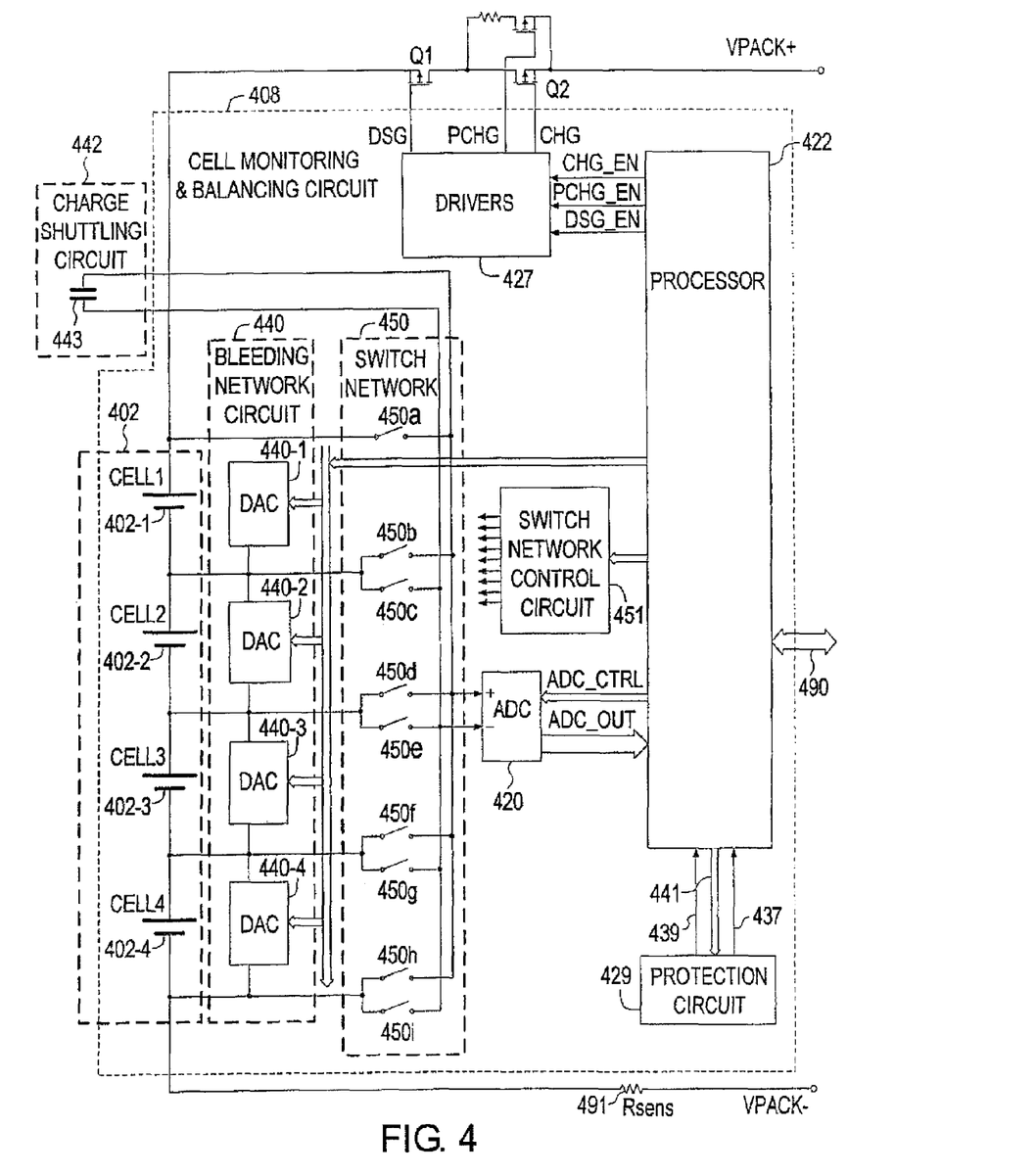
FIG. 4 is a more detailed block diagram of an exemplary cell monitoring and balancing circuit consistent with the invention.

Turning to FIG. 4, an exemplary cell monitoring and balancing circuit 408 is illustrated. The cell monitoring and balancing circuit 408 includes the functionality of the monitoring circuit 208 of FIG. 2 and the balancing circuit 308 of FIG. 3. In general, the circuit 408 may include an ADC 420, a processor 422, a switch network control circuit 451, a switch network 450, a bleeding network circuit 440, a driver circuit 427, and a protection circuit 429.

Individual analog cell voltage levels for each cell of the battery pack 402 may be sampled directly through the switch network 450. The sampled analog signals may then be converted into associated digital signals by the ADC 420 as previously detailed. For instance, when the first cell 402-1 is to be sampled, the switches 450*a* and 450*c* of the switch network 450 close, while all other switches of the switch network 450 remain open. As such, the positive terminal of the first cell 402-1 is coupled through switch 450*a* to the positive input terminal of the ADC 420. Also, the negative terminal of the first cell 402-1 is coupled through switch 450*c* to the negative input terminal of the ADC 420. All switches of the switch network 450 will remain in these positions until a valid analog to digital conversion is completed by the ADC 420 over a given conversion time period for the first cell 402-1.

Similarly the second cell 402-2 (through closed switches 450*b* and 450*e* with other switches of the switch network 450 open), the third cell 402-3 (through closed switches 450*d* and 450*g* with other switches of the switch network 450 open), and the fourth cell 402-4 (through closed switches 450*f* and 450*i* with other switches of the switch network 450 open) may also be directly coupled to the ADC 420 in a like manner for direct sampling of each cell 402-2, 402-3, and 402-4.

The charge shuttling circuit 442 may include an energy storage element such as a transformer, inductor, or capacitor. In the illustrated embodiment, a capacitor 443 is utilized as the energy storage element. If charge shuttling among cells is directed by the processor 422, the appropriate switches 450*a* to 450g of the switch network 450 direct charges from one or more of the cells with the higher voltage to be temporarily stored in the capacitor 443. Such charges are then shuttled to a lower voltage cell by the appropriate switches of the switch network 450. The processor 422 controls the switch network 450 via the switch network control circuit 451.

An ADC 420 consistent with the invention may also be calibrated for each individual cell 402-1, 402-2, 402-3, and 402-4 in order to compensate for any offset. Such offset can be due to any number of factors such as different voltage gradients, and switching charge injection for different ADC cell channels. For instance, to calibrate the first cell 402-1, switches 450b and 450c would be closed with all other switches of the switch network 450 open. As such, the input terminals of the ADC 420 are connected to the virtual ground of the first cell 402-1. The ADC 420 would then convert such analog signal into an associated first offset digital signal. The first offset digital signal may then be stored in any available memory device.

Similarly, to calibrate the second cell 402-2, switches 450d and 450e would be closed. To calibrate the third cell 402-3, switches 450f and 450g would be closed. Finally, to calibrate the fourth cell 402-4, switches 450h and 450i would be closed. As such, four offset values for each associated cell 402-1, 402-2, 402-3, and 402-4 can be obtained and stored. When the ADC 420 is later converting an analog measurement for an associated cell, the processor 422 can instruct acquisition of offset-free data by subtracting the stored associated offset value for the associated cell. As such, accurate measurement of the analog signal from each cell is further promoted.

A protection circuit 429 may also be incorporated into the cell balance and monitoring circuit 408 in order to monitor the current flowing into (charging mode) or out of (discharging mode) the battery pack 402 for various power crisis conditions, e.g., over current or short circuit conditions, and alert the processor 422 of such conditions so that preventative action can be taken. For instance, a current sensing element such as sense resistor 491 may be coupled to the battery pack 402 to provide the protection circuit 429 with a signal representative of the current level to or from the battery pack as that current level varies. If the current level is greater than a first current threshold level, (e.g., the voltage drop across the sense resistor 491 is greater than the first current threshold level times the value of the sense resistor), then the protection circuit 429 provides an over current alert signal to the processor 422 via data path 437.

The current level may be greater than a second current threshold level, where the second current threshold level is greater than the first current threshold level. In this instance (e.g., the voltage drop across the sense resistor is greater than the second current threshold level times the value of the sense resistor), the protection circuit 429 provides a short circuit alert signal to the processor via data path 439.

In response to such control signals from the protection circuit 429, the processor 422 makes decisions and sends appropriate control signals such that appropriate power safety measures are taken. The processor 422 may provide an appropriate control signal to the switch driver 427 in order to drive the discharge switch Q1 open. Alternatively, the processor 422 may also provide a message to a host component via data path 490 such that some alternative component, e.g., a power management unit, may manage any necessary corrective action to ensure power supply safety.

The bleeding network circuit 440 may include a plurality of bleeding circuits 440-1, 440-2, 440-3, and 440-4 to provide an adjustable bleeding current to each associated cell 402-1, 402-2, 402-3, and 404-4 as previously detailed.

Figure 5:
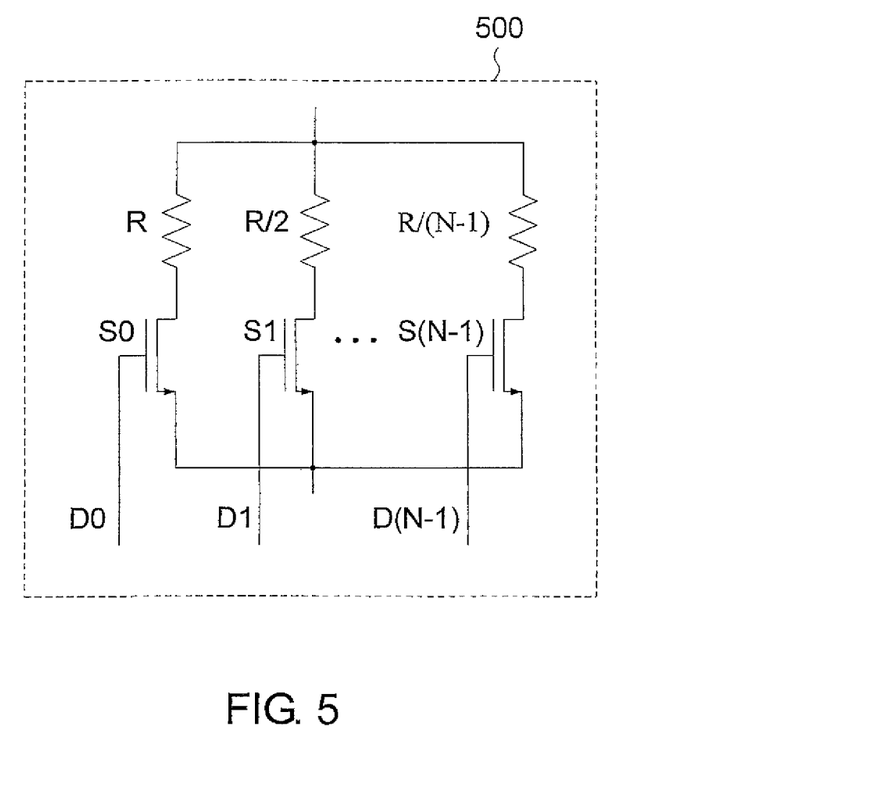
FIG. 5 is an exemplary circuit diagram of one bleeding circuit that may be utilized in the bleeding network circuit of FIG. 4.

Turning to FIG. 5, one exemplary bleeding circuit 500 is illustrated. The bleeding circuit is responsive to a digital control signal from the processor 422 to control the bleeding current from the associated cell 402-1, 402-2, 402-3, and 404-4 as previously detailed. The bleeding circuit 500 may include a plurality of switches S0, S1, S(N-1) and an associated plurality of resistive elements, e.g., resistors, having varying resistive values R, R/2, and R/(N-1). In one embodiment, the switches may be MOSFET type transistors having their control or gate terminal configured to receive the digital control signal from the processor 422. An N-bit digital control signal from the processor 422 may then dictate which switch S0, S1, S(N-1) turns ON and hence which resistive value R, R/2, or R/(N-1) is coupled in parallel with the associated battery cell 402-1, 402-2, 402-3, and 404-4, where the R/(N-1) resistive value is less than the R/2 resistive value, and the R/2 resistive value is less than the R resistive value.

If a large bleeding current is desired, the N-bit digital control signal from the processor 422 may instruct a second switch, e.g., switch S(N-1), to close such that a lower resistive value, e.g., R/(N-1), is coupled in parallel with the associated cell. As such, a larger bleeding current more quickly lowers the voltage level of the higher voltage cell. If a relatively smaller bleeding current is desired, the N-bit control signal from the processor 422 may instruct a first switch, e.g., switch S1, to close such that a relatively higher resistive value, e.g., R, is coupled in parallel with the associated cell. As such, a relatively smaller bleeding current is provided to more slowly lower the voltage level of a higher voltage cell.

The cell bleeding control signals from the processor 422 may also be provided to a battery gas gauge in order to provide such gauge with accurate cell bleeding information. For instance, a N-bit control signals provided to the cell bleeding circuits 440-1, 440-2, 440-3, 440-4 may also be provided to associated battery gas gauge. As such, the gauge also knows which cell 402-1, 402-2, 402-3, 402-4 is being bled and the associated bleeding current level for each cell. Therefore, the gauge can make more reliable calculations to determine the remaining amount of battery life taking into account bleeding current levels for charging capacity calculations.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A method of pre-balancing voltage levels for a plurality of battery cells of a battery pack, said method comprising:
converting a first analog voltage signal from a first battery cell in said battery cells to a first digital signal representative of a first voltage level of said first battery cell for each time period of a plurality of first time periods, to obtain a set of first digital signals;
converting a second analog voltage signal from a second battery cell in said battery cells to a second digital signal representative of a second voltage level of said second battery cell for said each time period of said plurality of first time periods, to obtain a set of second digital signals;

determining a difference between said first voltage level and said second voltage level for said each time period according to said set of first digital signals and said set of second digital signals;

comparing said difference for said each time period of said plurality of first time periods to a battery cell balance threshold;

determining whether an imbalance condition between said first battery cell and said second battery cell occurred in said plurality of first time periods according to said comparing; and in response to determining that said imbalance condition occurred, providing a pre-balance signal during a second time period, subsequent to said first time periods, before a difference between a voltage level of said first battery cell and a voltage level of said second battery cell exceeds said battery cell balance threshold.

2. The method of claim 1, wherein during said each time period of said plurality of first time periods, said battery pack works in either a first discharging mode or a first charging mode, and wherein during said second time period, said battery pack works in a second discharging mode.

3. The method of claim 1, wherein during said each time period of said plurality of first time periods, said battery pack works in either a first discharging mode or a first charging mode, and wherein during said second time period said battery pack works in a second charging mode.

4. The method of claim 1, wherein said battery pack further comprises at least one of a bleeding network circuit and a charge shuttling circuit, and wherein said providing a pre-balance signal comprises:

providing said pre-balance signal to at least one of said bleeding network circuit and said charge shuttling circuit, so as to initiate a balancing of said voltage level of said first battery cell and said voltage level of said second battery cell during said second time period.

5. The method of claim 4, wherein said pre-balance signal is provided to at least said bleeding network circuit, the method further comprising:

providing, during said second time period, a bleeding current from said bleeding network circuit to one of said first battery cell and said second battery cell in response to said pre-balance signal.

6. The method of claim 4, wherein said pre-balance signal is provided to at least said charge shuttling circuit, the method further comprising:

during said second time period, shuttling charges between said first battery cell and said second battery cell with said charge shuttling circuit in response to said pre-balance signal.

7. The method of claim 1, further comprising:

sampling said first analog voltage signal and said second analog voltage signal through a monitoring circuit.

8. The method of claim 7, wherein said monitoring circuit comprises a switch network.

9. The method of claim 1, wherein said cell balance threshold is adjustable by a processor.

10. The method of claim 9, further comprising adjusting said cell balance threshold based on ambient temperature.

11. The method of claim 1, wherein said converting a first analog voltage signal and said converting a second analog voltage signal are performed with an analog to digital converter (ADC).

12. The method of claim 11, wherein said ADC is an averaging type ADC.

13. The method of claim 12, further comprising:

sampling said first voltage level and said second voltage level for said first battery cell and said second battery cell with said averaging type ADC a plurality of times during said each time period before said converting of said first analog voltage signal and said second analog voltage signal.

14. The method of claim 11, further comprising:

sampling said first voltage level and said second voltage level with said ADC at least once prior to said converting of said first analog voltage signal and said second analog voltage signal during said each time period.

15. The method of claim 14, further comprising adjusting a frequency of said sampling.

16. The method of claim 1, further comprising:

sampling said first voltage level for said first battery cell during each sampling time interval of a plurality of sampling time intervals to obtain information indicative of an average level of said first voltage level; and sampling said second voltage level for said second battery cell during said each sampling time interval to obtain information indicative of an average level of said second voltage level, wherein said each time period of said plurality of first time periods comprises said plurality of sampling time intervals.

17. The method of claim 1, wherein said imbalance condition occurred if one of said first battery cell and said second battery cell has a lower voltage level than the other one of said first battery cell and said second battery cell during a predetermined number of time periods in said plurality of first time periods.

* * * * *